(12) United States Patent
Fercher

(10) Patent No.: US 7,113,288 B2
(45) Date of Patent: Sep. 26, 2006

(54) NUMERICAL A POSTERIORI DISPERSION COMPENSATION IN PCI MEASUREMENT SIGNALS AND OCT A-SCAN SIGNALS WITH SPATIALLY VARIANT CORRELATION CORE

(75) Inventor: Adolf Friedrich Fercher, Vienna (AT)

(73) Assignee: Carl Zeiss Jena GmbH, Jena (DE)

(*) Notice: Subject to any disclaimer, the term of this patent is extended or adjusted under 35 U.S.C. 154(b) by 253 days.

(21) Appl. No.: 10/172,565

(22) Filed: Jun. 13, 2002

(65) Prior Publication Data
US 2003/0043381 A1 Mar. 6, 2003

(30) Foreign Application Priority Data
Jun. 15, 2001 (DE) .......................... 101 29 651

(51) Int. Cl.
*G01B 9/02* (2006.01)

(52) U.S. Cl. ........................................ 356/479

(58) Field of Classification Search .............. 356/477, 356/479, 482, 497
See application file for complete search history.

(56) References Cited

U.S. PATENT DOCUMENTS 6,611,338 B1 * 8/2003 Knuttel et al. .............. 356/479

* cited by examiner

*Primary Examiner*—Gregory J. Toatley, Jr.
*Assistant Examiner*—Michael A. Lyons
(74) *Attorney, Agent, or Firm*—Reed Smith LLP

(57) ABSTRACT

A method and/or arrangement for compensating the dispersion in signals of short-coherence interferometers and/or OCT interferometers, wherein the effect of the dispersion is eliminated by subsequent compensation in that the interferometer signal is correlated with a spatially variant correlation core which corresponds along the measurement axis in z-direction to an interferometer signal of an individual light-reemitting location with the same dispersion which is punctiform in z-direction.

9 Claims, 8 Drawing Sheets

Input wave:

NUMERICAL A POSTERIORI DISPERSION COMPENSATION IN PCI MEASUREMENT SIGNALS AND OCT A-SCAN SIGNALS WITH SPATIALLY VARIANT CORRELATION CORE

CROSS-REFERENCE TO RELATED APPLICATIONS

This application claims priority of German Application No. 101 29 651.7, filed Jun. 15, 2001, the complete disclosure of which is hereby incorporated by reference.

BACKGROUND OF THE INVENTION a) Field of the Invention

The invention relates to numerical a posteriori dispersion compensation in PCI measurement signals and OCT-a-scan signals with a spatially variant correlation core.

b) Description of Background Technology

With the growth of high-resolution optical coherence tomography (OCT), broadband light sources are used increasingly. As a result, the dispersion of the traversed media has an increased influence on the OCT A-scan signal. Dispersion increases the coherence length and accordingly impairs the depth resolution of OCT.

SIGNIFICANCE OF THE INVENTION

The invention eliminates the increase in coherence length brought about by dispersion and the resulting distortion and lengthening of the A-scan signals by correlation of the local (with respect to the A-scan signal coordinate z) A-scan signal (this term derives from analog ultrasound technology) with a correlation core which corresponds to the ideal local signal that is subject to dispersion.

DESCRIPTION OF THE PREFERRED EMBODIMENTS

Figure 1:
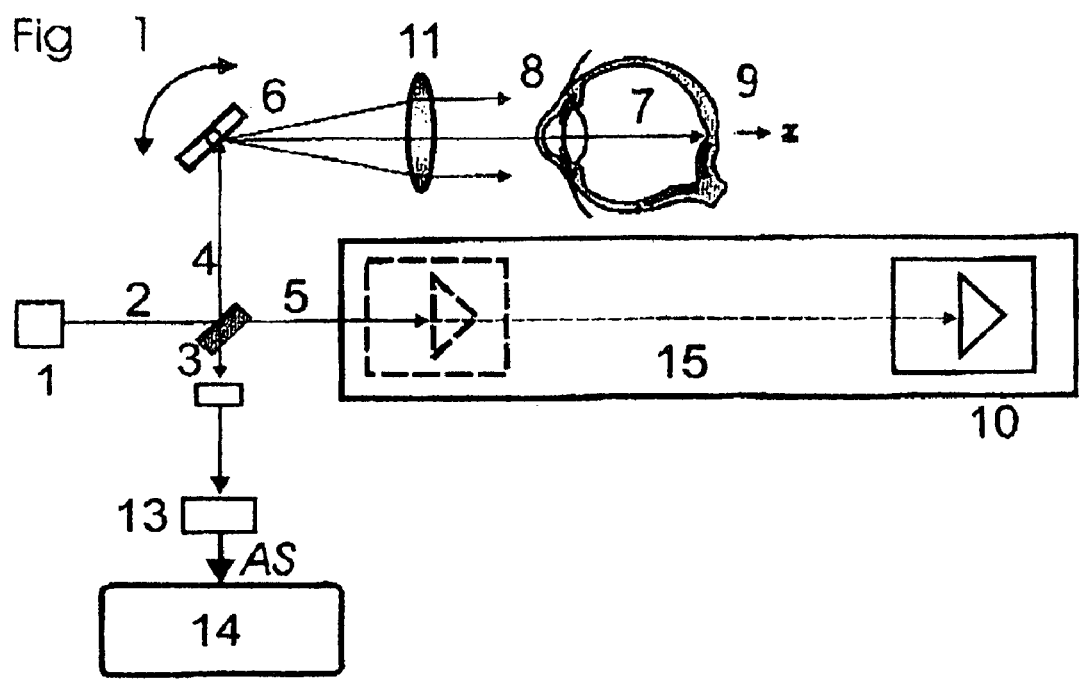
FIG. 1 shows an arrangement of the method according to the invention.

The light source 1 emits a short-coherent light beam 2. The light beam 2 is divided into a measurement beam 4 and a reference beam 5 by the beam splitter 3. The measurement beam 4 is directed to the measurement object 7 by the beam splitter 3 via scanning mirror 6 and optics 11. The measurement beam is partially reemitted or reflected back from the optical boundary surfaces of the measurement object 7 such as the front surface of the cornea 8 and the surface of the fundus 9.

The reference beam 5 penetrates the beam splitter 3, impinges on the reference mirror 10, which is mounted on a scanning table 15, and is reflected back from the reference mirror to the beam splitter 3. The reflected reference beam is mirrored on the photodetector 13 by the beam splitter 3 and interferes with the beam reemitted by the measurement object 7.

In short coherence interferometry and OCT, the recording of the signal is carried out during a displacement of the reference mirror 10. The depth positions of light-reemitting locations are registered by a PC 14 by means of the interference occurring at the photodetector 13 as electric A-scan signals AS. This interference occurs when the path length in the reference beam with a tolerance equal to the coherence length of the light is equal to the path length in the measurement beam.

The positions of light-reemitting locations in the measurement object are obtained in a known manner from the time interval between these signals and the known velocity of the movement of the reference mirror 10. This process is often called a "depth scan". It forms the basis of various short coherence interferometric length measurement processes and of optical coherence tomography.

In OCT, an image is formed from the signals of depth scans carried out adjacently in the object in a known manner.

Let $I_O(z;t)$ and $I_R(z;t)$ be the intensities of the object light and reference light. Then the intensity generated in a depth scan by a light-reemitting location at depth $z_0$ in the object at the interferometer output is given by the following interference rule:

$$I(z-z_0)=I_O+I_R+2\sqrt{I_O \cdot I_R} \cdot Re\{g(z-z_0)\}, \qquad (1)$$

where z is the position of the reference mirror, $z_0$ is the position of the light-reemitting location. The third summand to the right is the interference term because the interference phenomenon is expressed therein. The following signal, referred to as the (optical) A-scan signal corresponds to this. $g(z-z_0)$ is the complex degree of coherence connected with the coherence length (see M. Born and E. Wolf, "Principles of Optics", Cambridge University Press, 1998).

As can easily be seen from the relationships shown above, the resolution with which the depth position of light-reemitting location in the object can be localized is approximately the value of the coherence length of the utilized light. Physical optics textbooks (for example, the textbook by Born and Wolf) show that this coherence length has a magnitude of $$\frac{\lambda_0^2}{\Delta\lambda},$$

where $\lambda_0$ is the average wavelength of the utilized light and $\Delta\lambda$ is its wavelength bandwidth. The temporal length of this magnitude, $$\frac{1}{c} \cdot \frac{\lambda_0^2}{\Delta\lambda},$$

is called the coherence time.

The resolution in short coherence interferometry and OCT is impaired by dispersion in the measurement object. The greater the bandwidth of the utilized radiation, the greater this influence. As a result, for example, no resolution better than about 20 µm can be obtained at the fundus oculi even with such a short coherence length of the utilized radiation. Therefore, the dispersion must be compensated by realizing an identical dispersion (dispersion balance) in the reference arm of the interferometer, for example, by realizing an optical path through a transparent body of the same length and the same dispersion as the measurement beam. However, since there are different objects in the measurement beam and the measurement point can be located at different depths, it is often difficult, if not impossible, to realize a corresponding compensating optical path length in the measurement beam.

Therefore, it is the object of the invention to compensate the dispersion in a short coherence interferometer or OCT interferometer without providing compensating optical path lengths in the reference beam path or providing only such compensating optical path lengths with a fixed length. This is achieved by subsequent numerical compensation of the dispersion at the A-scan signal.

For this purpose, according to the invention, the interferometer signal AS(z) is numerically correlated with a correlation core $K(z-z_0)$ which corresponds along the z-axis to an interferometer signal of an individual light-reemitting location of the same dispersion which is punctiform in z-direction (this can be expressed mathematically as Delta function $\delta(z-z_0)$).

The exact form of this correlation core $K(z-z_0)$ is the interference term $g(z-z_0)$ of equation 1. $K(z-z_0)$ is obtained depending on $z-z_0$ as follows: First, the coherence function $g(z-z_0)$ is obtained, according to the rules of coherence optics, as a Fourier transform of the scaled wavelength spectrum. This is the interference term scaled to the quantity of 1. This interference term is modified corresponding to the different dispersion for different object depths z. The interference term obtained in this way is subjected to Fourier transformation in order to take into account the second order dispersion. The Fourier components of the interference term obtain an additional phase difference proportional to the square of the length in the dispersive object. In particular, the following procedure can be carried out for this purpose:

1. Use of theoretical formulas. First, the initial correlation core for dispersion of the second order and of a higher order is equated to zero. It corresponds to the interferometer signal with dispersion balance or also to a light pulse with the output spectrum of the light source. In many cases, a Gaussian form can be assumed:

$$V(z=0;t) \propto e^{-t^2/\tau_0^2} \cdot e^{i w_0 t} \quad (2)$$

The expression indicated in the textbook by Ghatak and Thyagarajan, "Introduction to Fiber Optics", Cambridge University Press, 1998, can be used to calculate the dispersed form of the correlation core:

$$V(z, t) \propto \exp\left[-\frac{(t - z/v_g)^2}{\tau^2(z)}\right] \cdot \exp[i(\Phi(z, t) - k_0 z)], \quad (3)$$

where $$\tau(z) = \tau_0(z)\sqrt{1 + \frac{4\alpha^2 z^2}{\tau_0^2}}, \quad \alpha = \frac{d^2 k}{d\omega^2}$$

is the dispersion of the second order, $\tau_0$ is the coherence time of the non-dispersed light. In particular, the following procedure can be taken:

Theoretical-numerical determination of the spatially variant correlation core from data of the light source and dispersive medium: The basis of this calculation consists in that a dispersing object in an interferometer has the same effect on a light pulse as on the interference term of this light pulse. A Gaussian envelope of the coherence function or Gaussian form of the spectrum is assumed, which is approximately the case in many partially coherent light sources. The method—like interference generally—is not very dependent on the shape of the envelope.

1. Output data (in SI units):

| | | | |
|---|---|---|---|
| Coherence time: | $\tau 0 := 0.35 \cdot 10^{-14}$ | $J := 1000$ | $j := 0 \ldots J - 1$ |
| Average wavelength: | $\lambda 0 := 5.5 \cdot 10^{-7}$ | | |
| Vacuum light velocity: | $c := 3 \cdot 10^8$ | | |
| Coherence length: | $c \cdot \tau 0 = 1.0500E - 006$ | | |

The object material is assumed to be glass. Dispersion quantities from Diels, Rudolph, "Ultrashort Laser Pulse Phenomena", Academic Press, 1996:

| | | |
|---|---|---|
| Index of refraction | n: | $n := 1.52$ |
| | | $d1n\lambda := -0.05$ |
| Dispersion of the second order: | | $d2n\lambda := 0.38 \cdot 10^{12}$ |

In order to enable comparison with other methods, according to the invention, for determining correlation cores, we calculate the correlation core based on the dispersed signal with respect to a microscope cover glass:

Glass thickness=z  $z := 0.144 \cdot 10^{-3}$

Dispersion of the first order: $d1k\omega := \frac{1}{c} \cdot (n - \lambda 0 \cdot d1n\lambda)$ Group velocity: $vg := \frac{1}{d1k\omega}$ 2. Calculation of signal shape of the initial wave (=output wave from the light source) according to Ghatak, Thyagarajan, "Introduction to Fiber Optics", equations 6.36 and 6.37.

$$\alpha := \frac{\lambda 0^3}{2 \cdot \pi \cdot c^2} \cdot d2n\lambda \quad \tau Z := \tau 0 \cdot \sqrt{1 + \frac{4}{\tau 0^4} \cdot \alpha^2 \cdot z^2}$$

$$\text{Dispersion} = \kappa := \frac{2 \cdot \alpha \cdot z}{\tau 0^4}\left(1 + \frac{4 \cdot \alpha^2 \cdot z^2}{\tau 0^4}\right)^{-1}$$

Time step: $\Delta \text{Time} := \frac{\tau Z \cdot 20}{J - 1}$

Mirroring of data due to discrete Fouier transformation: $kj := j-J$

Imput signal: $\Psi 0$ $$\Delta Time0 := \frac{\tau 0 \cdot 4 \cdot N}{J-1}$$

$$\Psi 10_j := \cos\left(2\cdot\pi\cdot\frac{c}{\lambda 0}\cdot j\cdot\Delta Time\right)\cdot\exp\left[-\frac{(j\cdot\Delta Time)^2}{\tau 0^2}\right]$$

$$\Psi 20_j := \cos\left(2\cdot\pi\cdot\frac{c}{\lambda 0}\cdot k_j\cdot\Delta Time\right)\cdot\exp\left[-\frac{(k_j\cdot\Delta Time)^2}{\tau 0^2}\right]$$

$$\Psi 0 := \Psi 10 + \Psi 20$$

Figure 2:
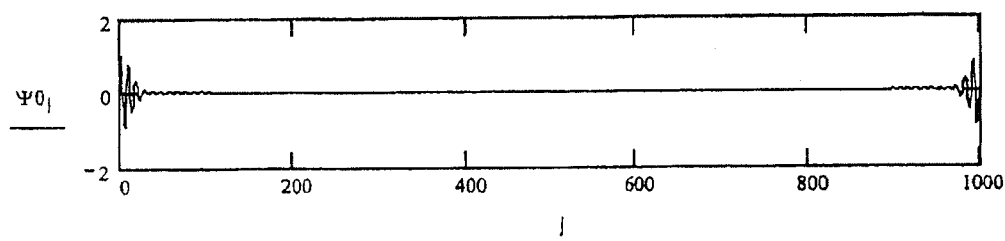
FIG. 2 shows an diagram of a mirrored form of an initial wave.

FIG. 2 illustrates a diagram that shows the mirrored form (this is the usual form in discrete Fourier transformation) of the initial wave. This corresponds to the interference term without dispersion.

Figure 3:
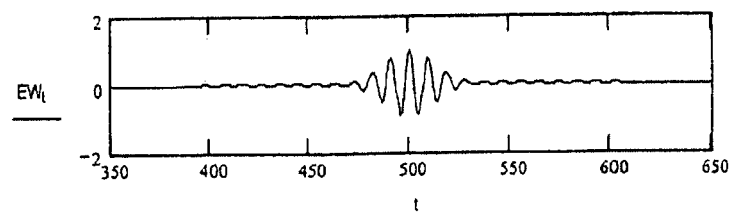
FIG. 3 shows an empirically obtained initial wave diagram.

FIG. 3 illustrates the empirically obtained initial wave; it corresponds to an interference term with this wave.

$$\text{Without mirroring } EW_j := \begin{vmatrix} \Psi 0_{j-\frac{J}{2}} & \text{if } j \geq \frac{J}{2} \\ \Psi 0_{j+\frac{J}{2}} & \text{if } j < \frac{J}{2} \end{vmatrix}$$

$t := 350 \ldots 650$

3. Dispersed wave after length z:

$$\Psi 1_j := \cos\left[2\cdot\pi\cdot\frac{c}{\lambda 0}\cdot j\cdot\Delta Time + \kappa\cdot(j\cdot\Delta Time)^2\right]\cdot$$
$$\exp\left[-\frac{(j\cdot\Delta Time)^2}{\tau Z^2}\right]$$

$\Delta Time \cdot (J-1) = 1.9686E-013$ $$\Psi 2_j := \cos\left[2\cdot\pi\cdot\frac{c}{\lambda 0}\cdot kj\cdot\Delta Time + \kappa\cdot(kj\cdot\Delta Time)^2\right]\cdot$$
$$\exp\left[-\frac{(kj\cdot\Delta Time)^2}{\tau Z^2}\right]$$

$\Psi := \Psi 1 + \Psi 2$

Figure 4:
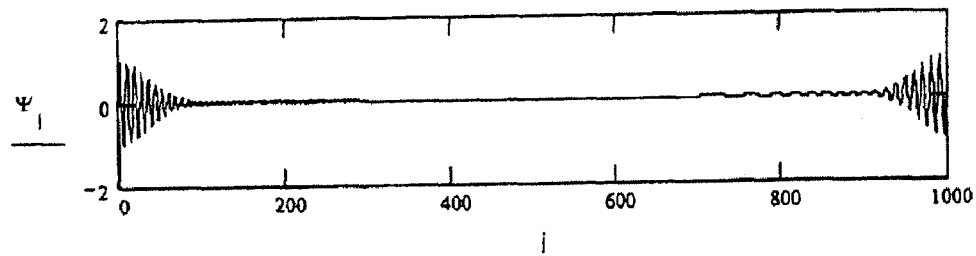
FIG. 4 shows a wave diagram that is lengthened by dispersion.

FIG. 4 illustrates the wave (in mirrored form) lengthened by dispersion. The greater length will easily be discerned by counting the periods and comparing with the initial wave. The dispersion has been taken into account through κ and the quadratic depth dependency by $(kj\cdot\Delta Time)^2$.

4. Dispersed waves without mirroring gives the spatially variant correlation core; calculated in this case for the back of the microscope cover glass $$DW_j := \begin{vmatrix} \Psi_{j-\frac{J}{2}} & \text{if } j \geq \frac{J}{2} \\ \Psi_{j+\frac{J}{2}} & \text{if } j < \frac{J}{2} \end{vmatrix}$$

$t1 := 350 \ldots 650$

Figure 5:
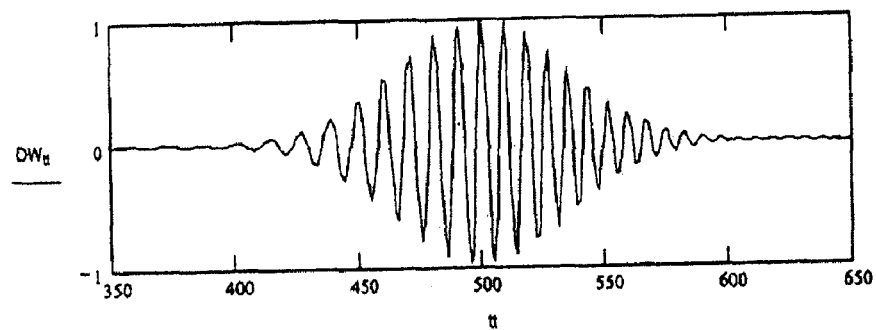
FIG. 5 shows a dispersed wave without mirroring.

FIG. 5 illustrates a dispersed wave (=correlation core) corresponds—up to the envelope—very precisely to the empirically obtained dispersed interference term of light reflected at the back of the microscope cover glass (see next example).

2. It is also possible to take a semi-empirical approach and to use a theoretical model of the initial correlation core and model the existing dispersion by means of an empirically registered dispersed interference term.

Semi-empirical determination of the spatially variant correlation core from a theoretical output signal without dispersion by adapting to the dispersed empirical signal.

1. Acquisition of the A-scan signal. This program part serves only to show the signal which is determined piecemeal in empirical measurements. When an A-scan signal is continuously plotted, a signal such as that shown at the end of this section of text as "A-scan" is obtained directly.

Figure 6:
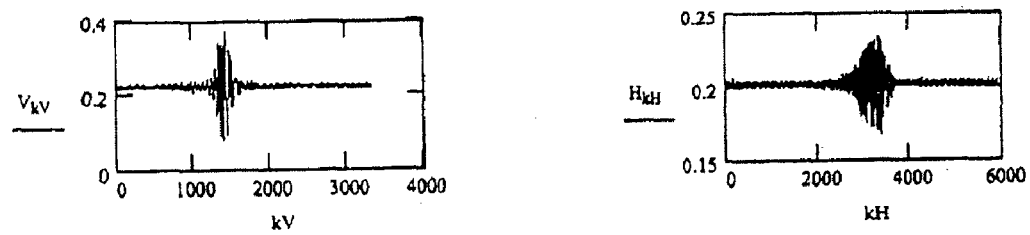
FIG. 6 shows wave diagrams of empirically dispersed and non-dispersed partial signals of an A-scan.

FIG. 6 shows these images are empirically dispersed (at right) and non-dispersed (left) partial signals of an A-scan.

Figure 7:
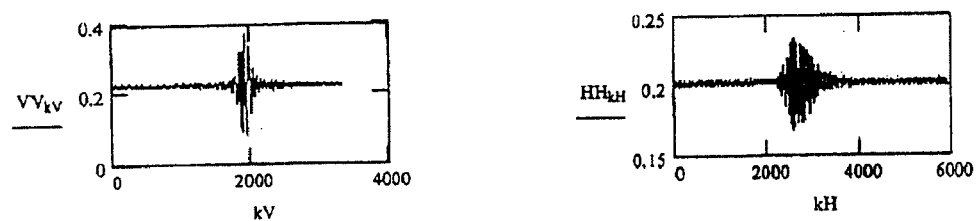
FIG. 7 shows two partial signals as illustrated in FIG. 6 with proper orientation.

$L := \text{length}(V) + \text{length}(H) = 9.2 \times 10^3 \quad j := 0..L-1$ $VV_{kV} := V_{length(V)-kV-1} \quad \text{length}(VV) = 3.3 \times 10^3 \quad HH_{kH} := H_{length(H)-kH-1}$
$\text{length}(HH) = 5.9 \times 10^3$ FIG. 7 shows the two partial signals have been given the correct orientation.

$L := \text{length}(V) + \text{length}(H) \quad L = 9.2 \times 10^3 \quad jj := 0 \ldots L-1$ $$Ascan_{jj} := \begin{vmatrix} k \leftarrow jj \\ VV_k & \text{if } k \leq \text{length}(V) - 1 \\ HH_{k-\text{length}(V)} + 0.0235 & \text{otherwise} \end{vmatrix}$$

Figure 8:
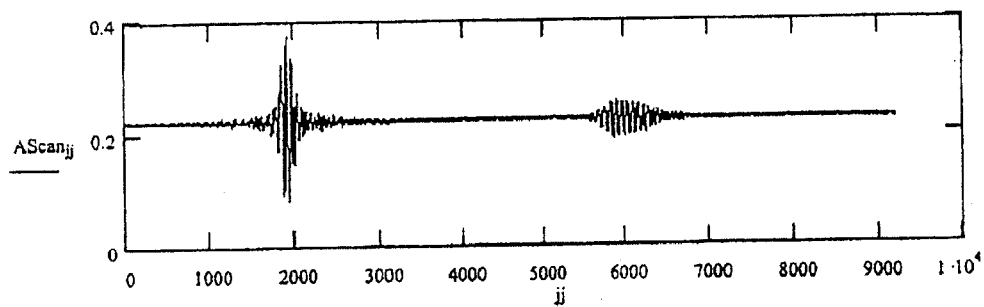
FIG. 8 shows an empirical A-scan signal.

FIG. 8 shows the empirical A-scan signal; at left without dispersion, at right with dispersion.

2. Hilbert transformation: In this program part a complex "analytic" signal S which helps to avoid the use of trigonometric relations and therefore substantially simplifies the subsequent calculations is calculated from the real A-scan signal according to Born and Wolf §10.2.

I:=Hilbert (A-scan) Analytic signal: $S_j := A\text{-scan}_j + i\cdot I_j$

Figure 9:
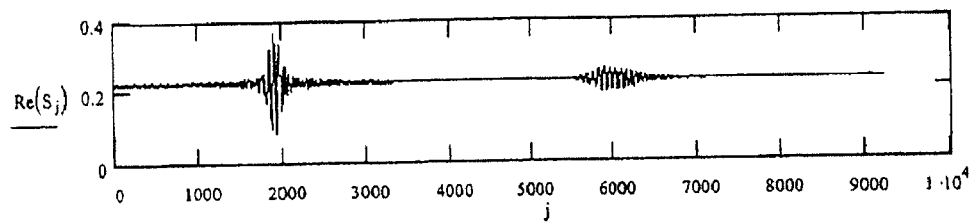
FIG. 9 shows a control plot diagram of the A-scan signal.

FIG. 9 illustrates a control plot of the A-scan signal which shows that the real part of the complex analytic signal equals the empirical A-scan signal.

3. Reduced signal: In this program part every 10th measurement value is selected for subsequent calculation in order to reduce the amount of data. This only reduces the computing time, but could also be omitted.

$a := 10.41 \quad c := 1.7$ $$J := 0 \ldots \frac{\text{length}(S)}{10} - 1 \quad Sred_j := S_{10\cdot J} - 0.225$$

Kor := icfft(DFK)

Figure 10:
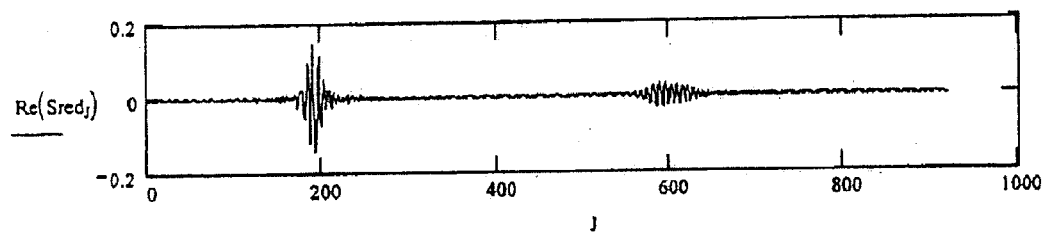
FIG. 10 shows another control plot diagram of the A-scan signal.

FIG. 10 illustrates another control plot which shows that the reduced signal correctly reproduces the original A-scan signal.

4. Calculation of the synthetic spatially variant correlation core:

Initial signal=y, with parameters
Am:=1 Bm:=1 Cm:=0.001 μ:=190 lc:=9.067

$$n := 130 \ldots \frac{2501}{10} - 1$$

$N_n := n$ $LK := 120$

The parameters Am and Bm determine amplitude and frequency of the output signal. The position of the center of the theoretical output signal y is 190.

$$y_n := Am \cdot \sin(Bm \cdot N_n) \cdot e^{\frac{-(N_n - \mu)^2}{lc^2} \cdot \ln(2)}$$

Figure 11:
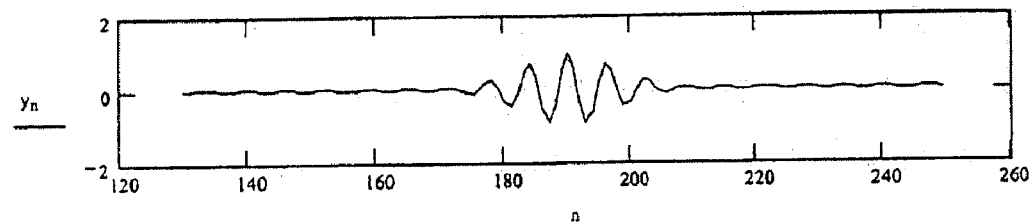
FIG. 11 shows a semi-empirical model of the initial signal.

FIG. 11 shows a semi-empirical model of the initial signal and only provides the basis for the correlation core to be obtained.

5. Basis of correlation kernel=section from y:
k:=0..LK−1 $RK_k$:=0.01·$Y_{k+130}$ IK:=Hilbert(RK)$SK_k$+i·$IK_k$ 6. Correlation kernel spectrum
on the back surface: FK:=cfft(SK)

7. Synthetic correlation kernel:

The quantity of the second order dispersion is determined by a and therefore depends on the position in the A-scan. This quantity a is obtained by trial and error by comparison to the empirical signal (Bez). Starting with small values around zero, the chirp (change in period length) of the synthetic correlation kernel is matched to the chirp of the empirical signal. The correlation kernel is centered in the correlation window by means of 44.01 and c·a, with different values of a. The value of a depends on the object depth. For a cover glass with a thickness of 140 μm of BK 7 and a filtered Hg high-pressure lamp as light source, a=10.41. Intermediate values of a in BK 7 can be interpolated; a thickness of zero corresponds to a=0. Greater BK 7 thicknesses can be extrapolated linearly.

$$DFK_k := FK_k \cdot e^{-i \cdot \pi \cdot a \frac{k^2}{LK} + i \cdot \pi \cdot k \cdot (44.01 + c \cdot a)}$$

Figure 12:
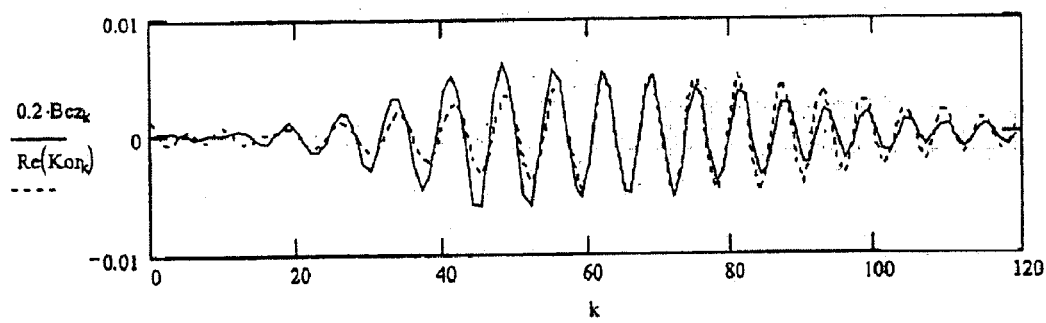
FIG. 12 is a diagram illustrating the matching of the synthetic correlation fore to the empirically obtained reference signal.

FIG. 12 shows the matching of the synthetic correlation core (Kor) to the empirically obtained reference signal (Bez).

3. Empirical Method

Finally, it is also possible to pursue a completely empirical method and to use the numerical A-scan interferometer signal as initial correlation core; this numerical A-scan interferometer signal is obtained from a first boundary surface of an object or of a mirror directed normal to the measurement beam in the beam path. In the dispersing medium, due to the second order dispersion, the Fourier components of this signal undergo an additional phase which is quadratically dependent on the Fourier coordinate. This additional phase can be included in the numerically calculated Fourier transform of the A-scan interferometer signal. This method was selected for the following (see the explanations). This method has the advantage over the use of theoretical formulas described above that neither the coherence time nor the shape of the emission spectrum need be known.

First, the numerical correlation method should be explained: The numerical correlation can be carried out by PC, specifically, in the first place, by means of the real intensity values of interferometer signal IS(z) and correlation core K(z−$z_0$). This correlation then has the following form:

$$\frac{1}{m} \sum_{i=0}^{i=m-1} [I_i - \bar{I}][K_i - \bar{K}], \tag{3}$$

where $\bar{I}$ and $\bar{K}$ are mean values of I and K; m corresponds to z−$z_0$ in K(z−$z_0$).

Alternatively, in the second place, the associated complex values $\hat{I}$ and $\hat{K}$ can be formed from the interferometer signal IS(z) and correlation core K(z−$z_0$) by means of the Hilbert transformation and the envelope of the correlation can be obtained by the product $$\hat{I} \cdot \hat{K}^* \tag{4},$$

where $\hat{K}^*$ is the conjugate complex correlation core. Example of dispersion compensation of the A-scan signal, according to the invention, at an object comprising BK7 with two boundary surfaces at a distance of 142 micrometers with an empirically detected correlation core.

1. Acquisition of the A-scan signal. This first program part serves only to show the signal which is empirically determined in the first measurement in a somewhat complicated and piecemeal way. When an A-scan signal is continuously plotted, a signal such as that shown at the end of this section of text as "A-scan" is obtained.

Figure 13:
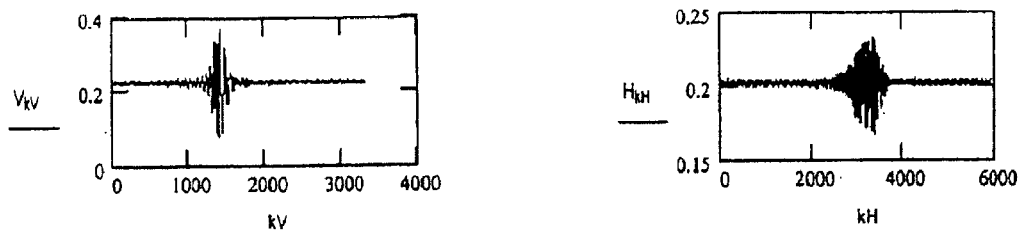
FIG. 13 shows an empirically determined A-scan signal of a glass plate.

FIG. 13 shows an empirically determined A-scan signal of a glass plate is shown at left without dispersion and at right with dispersion.

$$L := \text{length}(V) + \text{length}(H) \quad L = 9.2 \times 10^3 \quad j := 0..L-1$$

$$VV_{kV} := V_{\text{length}(V)-kV-1} \quad \text{length}(VV) = 3.3 \times 10^3 \quad HH_{kH} := H_{\text{length}(H)-kH-1}$$
$$\text{length}(HH) = 5.9 \times 10^3$$

Figure 14:
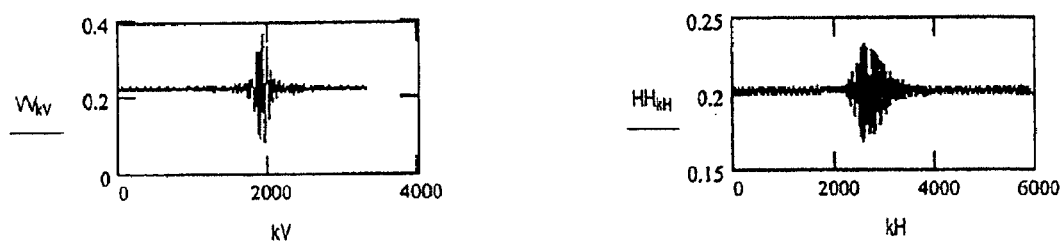
FIG. 14 shows the corrected signals of FIG. 13.

FIG. 14 shows the A-scan signals above were recorded in a laterally inverted manner, this has been corrected here.

$$L := \text{length}(V) + \text{length}(H) \quad L = 9.2 \times 10^3 \quad ij := 0 \ldots L-1$$

$$Ascan_{ij} := \begin{vmatrix} k \leftarrow ij \\ W_k & \text{if } k \leq \text{length}(V)-1 \\ HH_{k-\text{length}(V)} + 0.0235 & \text{otherwise} \end{vmatrix}$$

Figure 15:
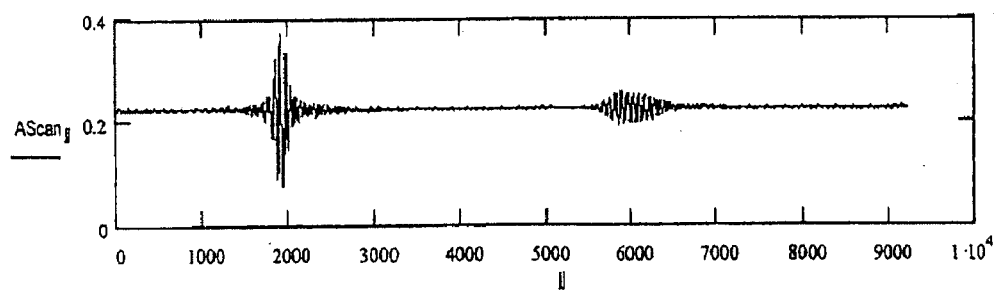
FIG. 15 shows the empirical A-scan signal for demonstrating the method according to the invention.

FIG. 15 shows the empirical A-scan signal for demonstrating the method according to the invention.

2. Hilbert Transformation: In this program part a complex "analytic" signal S which helps to avoid the use of trigonometric relations and therefore substantially simplifies the subsequent calculations is calculated from the real A-scan signal according to Born and Wolf, §10.2.

I:=Hilbert (A-scan)

Complex signal: $S_j$:=A-$\text{scan}_j$+i·$I_j$

Figure 16:
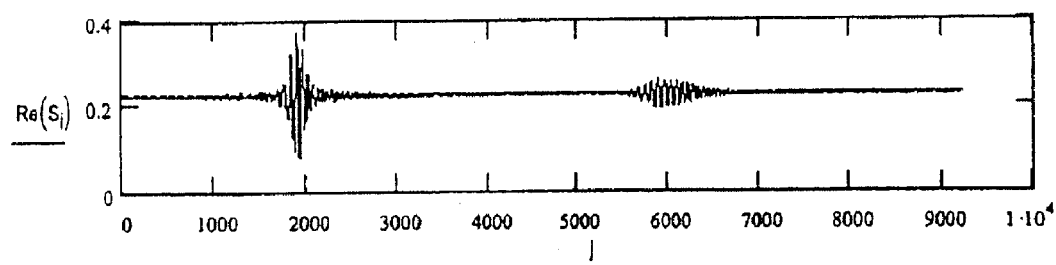
FIG. 16 shows the real part of the complex signal shown in FIG. 15.

FIG. 16 shows that the real part of the complex signal matches the above A-scan signal.

3. Reduced signal: In this program part every 10th measurement is selected for further calculation in order to reduce the amount of empirical data.

$$J := 0 \ldots \frac{\text{length}(S)}{10} - 1$$

$$Sred_j := S_{10 \cdot J} - 0.225$$

Figure 17:
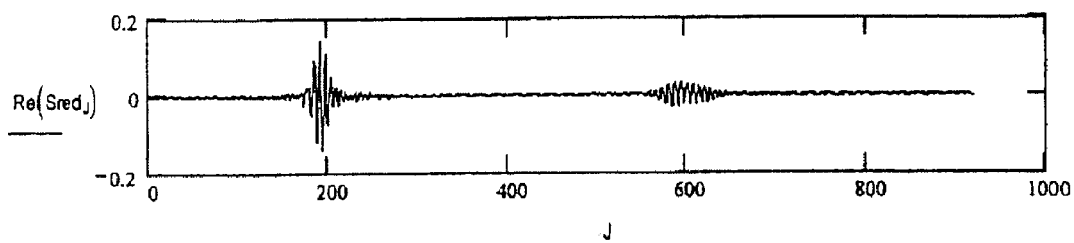
FIG. 17 shows the real part of the reduced signal shown in FIG. 15.

FIG. 17 shows that the real part of the reduced signal matches the A-scan signal.

4. Reference signal: A prominent A-scan reflection with known dispersion—in this case, without dispersion—because it originated at the point of entry into the dispersive object, is used to model the correlation term. Here again, for the sake of simplification, only every tenth measurement value is used (Bred), which reduces the computing time; every measurement value could also be taken.

Section: $b := 1300 \ldots 2500$ $$B_b := \begin{vmatrix} w \leftarrow b \\ Ascan_w - 0.225 & \text{if } w \geq 1735 \wedge w \leq 2087 \\ 0 & \text{otherwise} \end{vmatrix}$$

5. Reduced reference signal:

$$\underline{Bred} \quad V := 130 \ldots \frac{\text{length}(B)}{10} - 1 \quad Bred_v := B_{10 \cdot V}$$

Figure 18:
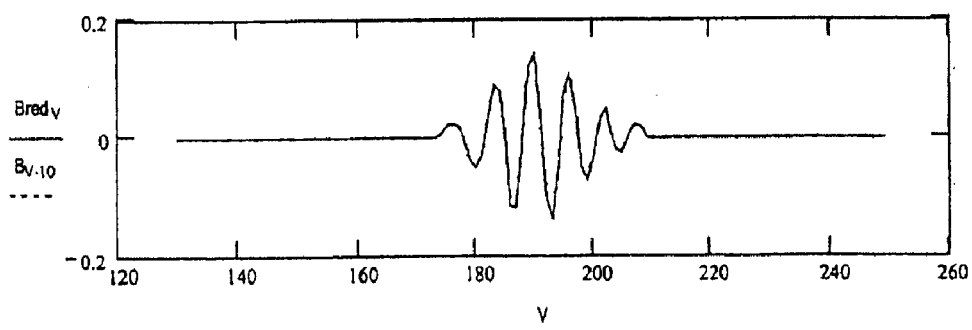
FIG. 18 shows a reduced reference signal.

Bred is the reference signal used for the core obtained as shown in FIG. 18.

6. Basis of correlation core=section from Bred: Only the signal in the strict sense, in this case, the part from V=130 to V=250, is used for the actual modeling of the correlation core.

$LK := 120 \quad k := 0..LK-1 \quad RK_k := Bred_{k+130} \quad IK := \text{Hilbert}(RK) \quad SK_k := RK_k + i \cdot IK_k$ 7. FT: The Fourier transform is formed from the basis of the correlation core SK according to the invention. The partial signal used for modeling the correlation core is referred to as the basis of the correlation core.

$FK := \text{cfft}(SK)$

8. Dispersion reference signal: According to the invention, a dispersed A-scan reflection is used below (in the Figure) for comparing to the modeled correlation core:

$Bez_k := \text{Re}(Sred_{k+540})$

9. Correlation core spectrum: Here, the non-dispersed A-scan signal is provided, according to the invention, with a phase term which is quadratically dependent on the A-scan coordinate (index k). This phase term models the second order dispersion. The value a is dependent on the correlation location. It is obtained empirically, that is, starting with a=1, the correlation core obtained in this way is compared to the dispersed signal Bez, and a is changed until it matches Bez as can be seen in the plot below (10.). The correct phase position of the correlation core in the correlation window is provided for by c and 44.

$a := 10.5 \quad c := 1.7$ $$DFK_k := FK_k \cdot e^{-i \pi \cdot a \cdot LK \cdot \left(\frac{k}{LK}\right)^2 + i \pi \cdot k \cdot (a \cdot c + 44)}$$

10. Correlation core: According to the invention, the correlation core is obtained by inverse Fourier transformation. This is the spatially variant correlation core. The spatial dependence is expressed by a. For a depth of 140 om in BK 7, a has the value 10.5. Intermediate values can be obtained through interpolation, wherein a depth of zero in the glass corresponds to a=0. Values for greater depths in the glass can be obtained through corresponding linear extrapolation. The illustration demonstrates the good match (imaged for purposes of demonstration by means of the phase superimposed on gaps) of the modeled correlation core (Kor) with the dispersed empirical A-scan signal (Bez).

$Kor := \text{icfft}(DFK)$

Figure 19:
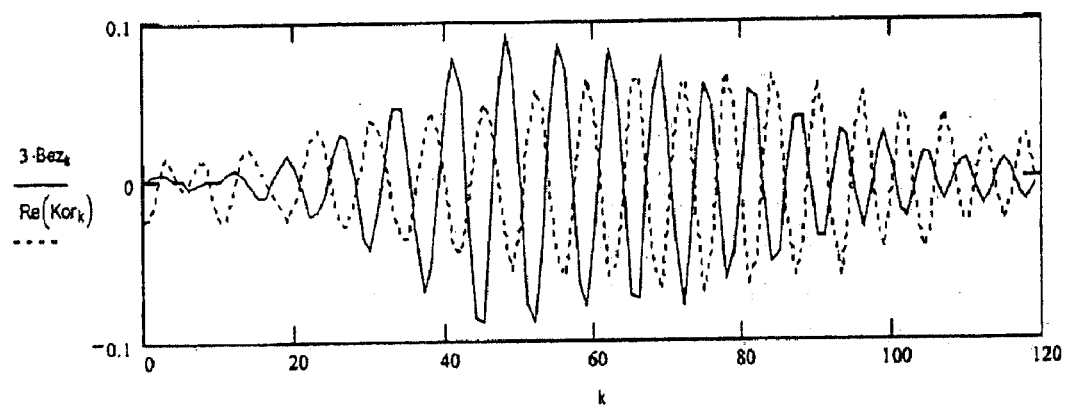
FIG. 19 shows an empirically obtained signal obtained by matching of the real part of the correlation core with the reference signal.

FIG. 19 shows the empirically obtained matching of the real part of the correlation core Kor with the reference signal Bez by changing a and c.

11. Correlation. The correlation is formed by the product (SMS·SKor=) of the complex A-scan signal times the correlation core which changes along the A-scan axis, that is, the spatially variant correlation core. The real part, the amount, the square of the amount (in this case) or another quantity derived from the product (SMS·SKor=) can be used to show the A-scan signal.

According to the invention, the amplitude of the A-scan signals which is reduced by dispersion can also be increased by multiplying the correlation core by a quantity dependent on the A-scan coordinate (K) (K can be read from the plot of the correlation signal SM; the weaker the signals at high values of K, the greater the exponent of K which must be selected). The optimal value in the present example is approximately K raised to 0.8); the optimal value depends on the quality of the correlation core and on the window size. This value can also be arranged in an object-dependent manner; for example, it can be selected so as to be greater in the case of highly dispersive objects.

This is the program which calculates the correlation: The correlation core spectrum with the empirically obtained Fourier coefficient FK of the output core and the phase term which is quadratically dependent on j and takes into account the dispersion is in the fifth line from the top. In the following line, the inverse Fourier transformation (icfft) is carried out, then submatrices which a length of 120 elements are formed for the correlation calculation in the last program line.

Figure 20:
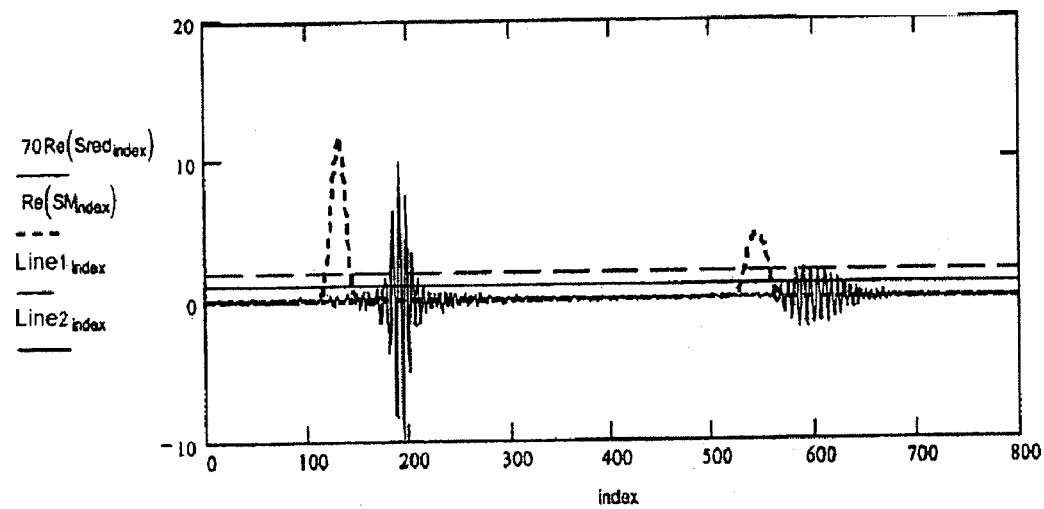
FIG. 20 shows an arrangement of the method according to the invention.

FIG. 20 shows that the half-value width of the dispersed signal (signal at right; continuous line) has been more than halved by the dispersion compensation (signal at right; dashed line). The shift of the correlation function on the left-hand side is the window width; this shift could easily be eliminated. In this instance, it simplifies the image.

While the foregoing description and drawings represent the present invention, it will be obvious to those skilled in the art that various changes may be made therein without departing from the true spirit and scope of the present invention.

What is claimed is:

1. A method for compensating the dispersion in signals of short coherence interferometers and/or OCT interferometers, comprising the steps of:

simultaneously receiving as an interferometer signal a measurement signal coming from a measurement object and a reference signal, the measurement signal being a single signal generated from a single light source having a central wavelength which is irradiated on to the measurement object; and eliminating the effect of the dispersion by subsequent compensation based on a correlation of the interferometer signal with a spatially variant correlation core which corresponds along the measurement axis in z-direction to an interferometer signal of an individual light-reemitting location with the same dispersion which is punctiform in z-direction.

2. The method according to claim 1, wherein the spatially variant correlation core is determined from empirically measured interferograms.

3. The method according to claim 1, wherein the spatially variant correlation core is determined by a theoretical formula that is used to calculate a dispersed form of the correlation core.

4. The method according to claim 3, wherein the formula is:

$$V(z, t) \propto \exp\left[-\frac{(t - z/v_g)^2}{\tau^2(z)}\right] \cdot \exp[i(\Phi(z, t) - k_0 z)]$$

where $$\tau(z) = \tau_0(z)\sqrt{1 + \frac{4\alpha^2 z^2}{\tau_0^2}}, \quad \alpha = \frac{d^2 k}{d\omega^2}$$

is the dispersion of the second order; $\tau_0$ is the coherence time of the non-dispersed light.

5. An arrangement for compensating the dispersion in signals of short coherence interferometers and/or OCT interferometers comprising:
   a detector that simultaneously receives as an interferometer signal a measurement signal coming from a measurement object and a reference signal, the measurement signal being a single signal generated from a single light source having a central wavelength which is irradiated on to the measurement object;
   a processor operable to eliminate the effect of the dispersion by subsequent compensation by correlating the interferometer signal with a spatially variant correlation core which corresponds along the measurement axis in z-direction to an interferometer signal of an individual light-remitting location with the same dispersion which is punctiform in z-direction.

6. The arrangement according to claim 5, wherein the spatially variant correlation core is determined from empirically measured interferograms.

7. The arrangement according to claim 5, wherein the spatially variant correlation core is determined by a theoretical formula that is used to calculate a dispersed form of the correlation core.

8. The arrangement according to claim 7, wherein the formula is:

$$V(z, t) \propto \exp\left[-\frac{(t - z/v_g)^2}{\tau^2(z)}\right] \cdot \exp[i(\Phi(z, t) - k_0 z)]$$

where $$\tau(z) = \tau_0(z)\sqrt{1 + \frac{4\alpha^2 z^2}{\tau_0^2}}, \quad \alpha = \frac{d^2 k}{d\omega^2}$$

is the dispersion of the second order; $\tau_0$ is the coherence time of the non-dispersed light.

9. A method for compensating the dispersion in signals of short coherence interferometers or OCT interferometers, comprising the steps of:
   generating a light from a single light source having a central wavelength;
   directing the generated light to both an object beam path and a reference beam path;
   simultaneously receiving as an interferometer detection signal a return object signal from the object beam path and a reference signal from the reference beam path, the return object signal being a single signal generated from the single light source which is irradiated on to the measurement object; and
   removing the dispersion effect from the interferometer detection signal based on a correlation of the interferometer detection signal with a spatially variant correlation core which corresponds along the measurement axis in z-direction to an interferometer signal of an individual light-reemitting location with the same dispersion in z-direction.

* * * * *